Dec. 2, 1952  R. D. BEATTY, JR  2,620,242
BEARING ASSEMBLY UNIT
Filed July 14, 1949

INVENTOR.
ROBERT D. BEATTY JR.
BY Hudson, Boughton,
Williams, David & Hoffmann.
ATTORNEYS Patented Dec. 2, 1952

2,620,242

UNITED STATES PATENT OFFICE 2,620,242

BEARING ASSEMBLY UNIT

Robert D. Beatty, Jr., Shaker Heights, Ohio

Application July 14, 1949, Serial No. 104,782

3 Claims. (Cl. 308—187.2)

This invention relates to antifriction bearings for rotatably supporting shafts and the like and, more particularly, to an improved construction which provides such an antifriction bearing in the form of a self-contained assembly unit which is effectively sealed for the retention of a supply of lubricant therein and the exclusion of foreign matter. The improved bearing assembly can be applied to various uses but since it is well suited for mounting conveyor roll shafts on a support, it is illustrated and described herein as applied to that particular use but without any intention of limiting the invention in this respect.

Attempts have been made heretofore to provide an antifriction bearing assembly which will be self-lubricating by reason of the fact that it has a quantity of lubricant confined therein. All of such bearings which have previously come to my attention have been special bearings designed for a particular application, and hence, have had only a limited range of use and have been very costly. Moreover, in all of such earlier bearings of this type of which I am aware, the races were almost entirely exposed, and hence, were subject to the accumulation of dirt thereon and also to blows delivered thereagainst which are likely to cause misalignment of the races and to nick or mar the same. Another disadvantage of such earlier bearings of this type is that they have not been watertight, and hence, have been subject to more rapid wear and deterioration by reason of the entry of water and other foreign substances thereinto.

As one of its objects, this invention provides a self-contained antifriction bearing assembly having an improved construction by which all of the above-mentioned disadvantages are overcome, and which bearing assembly comprises a relatively small number of parts adapted to be economically produced and assembled and will render efficient service for an indefinite period of time without requiring attention.

Another object of the present invention is to provide an improved antifriction bearing in the form of a self-contained device having a preformed standard antifriction unit embodied therein and which device includes a rugged outer housing as a mount and protection for the antifriction unit, as well as a container for a supply of lubricant, and in which the outer housing is effectively sealed against loss of the lubricant or the entry of water or foreign matter.

Still another object is to provide an improved construction for an antifriction bearing of the type comprising an outer housing and a preformed conventional standard antifriction bearing unit mounted therein, and in which a thimble extending into the housing forms a socket adapted to receive the end of a shaft or the like to be supported and has its closed inner end connected with the inner race of the bearing unit for rotation of the thimble therewith.

Yet another object is to provide an improved construction for an antifriction bearing of the character mentioned in which the outer housing is formed by connected housing members and one of which has a central opening in substantially axially aligned relation to the inner race and carries packing means disposed in surrounding relation to such opening and sealingly engaging the sleeve portion of the thimble.

As another object this invention provides an improved antifriction bearing of the character mentioned in which the housing members are of such simple form that they can be produced as die castings which require little or no machining and can be connected together merely by a press fit.

The invention can be further briefly summarized as consisting in certain novel combinations and arrangements of parts hereinafter described in detail and particularly set out in the claims hereof.

In the accompanying sheet of drawings.

Figure 2:
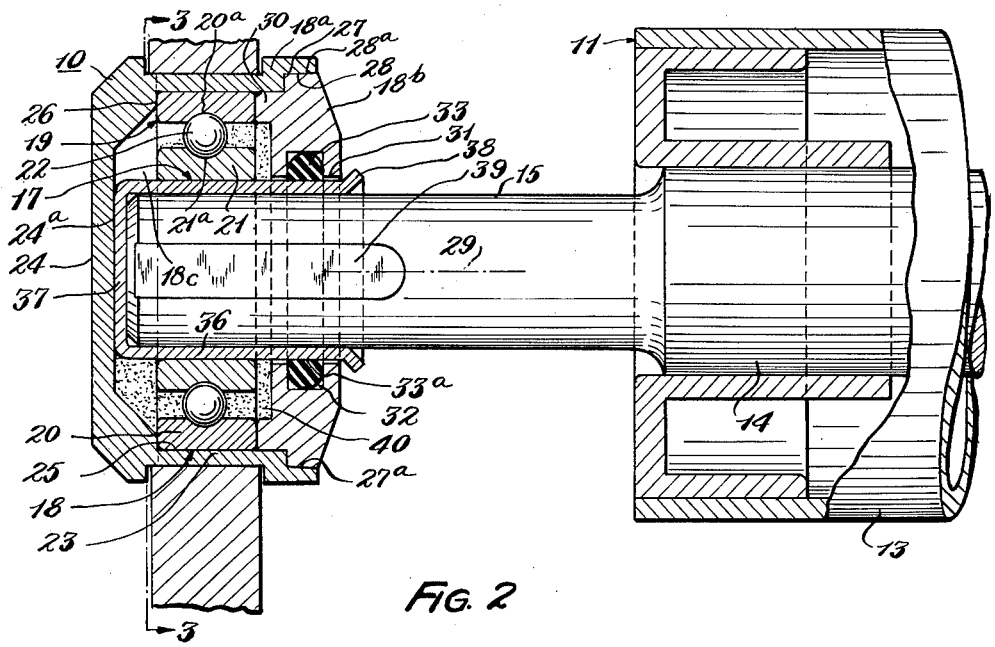
Fig. 2 is a longitudinal sectional view taken through the bearing assembly substantially as indicated by section line 2—2 of Fig. 1 and showing the bearing assembly on an enlarged scale.
Figure 1:
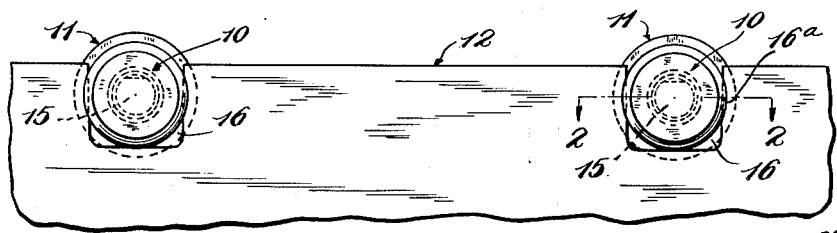
Fig. 1 is an elevational view showing the improved bearing being used for rotatably mounting conveyor roll shafts on a support.

As one practical embodiment of this invention the accompanying drawing shows the improved bearing assembly 10 being used for mounting conveyor rolls 11 on a support 12 at longitudinally spaced points thereof. The conveyor rolls are here shown as being of the type having a roll body 13 mounted on a shaft 14 which is provided with reduced portions 15 at opposite ends thereof. The improved bearing assemblies 10 are self-contained units which are applied to the reduced ends 15 of the roll shaft 14 and are seated in recesses 16 which are provided at longitudinally spaced points in the upper edge of an upright plate or stringer constituting the support 12.

The bearing assembly 10 comprises an outer housing 18, a preformed conventional standard antifriction bearing unit 19 mounted in such housing and a thimble 17 forming a closure for the housing and also a socket adapted to receive one of the reduced ends 15 of the shaft 14 for mounting the bearing assembly thereon. The housing 18 comprises connected complemental housing members 18a and 18b which define a bearing chamber 18c in which the antifriction bearing unit 19 is located.

The antifriction bearing unit 19 is a preformed or prefabricated unit, preferably of a commercially available standard size, comprising outer and inner annular races 20 and 21 having grooves 20a and 21a in their adjacent faces and an annular series of rolling elements 22 disposed between such races and operable in the grooves thereof. The rolling elements are here shown as being balls and hence the prefabricated unit 19 can be referred to as a standard ball bearing, although a unit embodying rolling elements of some other form, such as rollers, could be used.

The housing member 18a is a substantially cylindrical cup-shaped member having an annular side wall 23 and a substantially flat transverse end wall 24 formed integral with the side wall and closing the cup-shaped member at one end thereof. The internal annular face of the side wall 23 forms a substantially cylindrical radial thrust seat 25 which is engaged by the outer periphery of the outer race 20 for mounting the bearing unit 19 in the chamber 21. An annular shoulder 26 formed on the end wall 24 immediately adjacent the annular radial thrust seat 25 forms an axial thrust seat which is engaged by one end of the outer race of the bearing unit 19. A flat inner face provided on the end wall 24 also forms an axial thrust surface or seat 24a to which further reference will be made hereinafter.

The housing member 18b is a disk-like member which forms a cover for closing the open end of the cup-shaped housing member 18a. The cover 18b can be connected with the cup-shaped housing member 18a by providing the latter with an annular counterbore 27 in which the outer edge portion 28 of the cover is engaged with a press fit. For facilitating the assembly of the cover in this counterbore the internal annular face 27a forming the side wall of the counterbore can be a tapered face having an outwardly diverging slope of a small angle, such as approximately two degrees with respect to the axis of rotation 29. The outer face 28a of the edge portion 28 of the cover has a similar taper thereon. When the cover 18b is assembled in the outer end of the cup-shaped housing member 18a with such a press fit, no other connecting means is needed for holding these housing members together and the connection formed at this point will be a tight joint through which no water or other foreign matter can pass.

The cover 18b is preferably also provided with an axially projecting annular shoulder portion which extends into the chamber 18c and forms an axial thrust seat 30 therein in opposed relation to the axial thrust seat 26 and which is engaged by the opposite end of the outer race 20 of the prefabricated antifriction bearing unit 19. The cover 18b is also provided with a substantially central opening 31 which communicates with one end of the chamber 18c in substantially coaxial relation to the inner race 21 of the unit 19 and the rotation axis 29. The internal annular face of the cover 18b which defines the opening 31 is provided with an internal groove 32 in which an annular packing ring 33 is disposed.

The antifriction bearing unit 19 is mounted in the chamber 18c of the outer housing 18 by having the outer race 20 held in the cup-shaped housing member 18a in relatively fixed relation thereto. The outer race is held in this relatively fixed relation by its engagement with the radial thrust seat 25 and its engagement with the opposed axial thrust seats 26 and 30. When the antifriction bearing unit 19 is mounted in this relation in the outer housing 18 the inner race 21 will be located opposite the opening 31 of the cover 18b and in substantially coaxially aligned relation thereto.

With respect to the antifriction bearing unit 19, it is of practical importance that this unit is a prefabricated conventional antifriction bearing unit of a standard size such as is produced and stocked in large quantities by various commercial bearing manufacturers and, as such, can be readily obtained at low cost. The bearing unit 19 is assembled into the outer housing 18 by establishing a press fit between the external face of the outer race 20 and the radial thrust seat 25 of the cup-shaped housing member 18a. When the bearing unit 19 is assembled in this relation in the outer housing, the inner race 21 will be supported for free rotation in the outer race by the annular series of rolling elements 22.

The thimble 17 constitutes an important element of the improved bearing assembly 10 because it forms a socket which is adapted to receive the reduced shaft end 15 for mounting the bearing assembly thereon and also forms a closure for the opening 31 of the cover 18b. The thimble 17 comprises a substantially cylindrical sleeve 36 and a substantially flat transverse integral end wall 37 at the inner end thereof. The portion of the sleeve 36 which is adjacent the end wall 37 is engaged in the inner race 21 with a sufficiently tight fit to mount the thimble in the bearing unit 19 for rotation of the thimble with the inner race thereof.

The outer end of the sleeve 36 of the thimble 17 extends outwardly into or through the opening 31 of the cover 18b and substantially closes that opening. The packing ring 33 of the cover 18b sealingly engages the sleeve 36 to form a tight joint at this point. The packing ring 33 can be of any suitable material such as synthetic rubber and, as shown in this instance, may be of a substantially D-shaped cross-section and is disposed in the groove 32 with its flat face 33a in sealing engagement with the sleeve 36 of the thimble. The transverse inner end wall 37 of the thimble 17 engages the flat thrust face 24a of the end wall of the housing member 18a so that this face forms an axial thrust seat for the thimble 17 and for the roll shaft 14.

In the improved bearing 10 the thimble 17 is preferably of an axial length such that its outer end projects from the opening 31 of the cover 18b. This projecting outer end of the thimble includes a portion which extends in angular relation to the sleeve 36 for forming a centrifugal slinger by which oil, water, dirt and other foreign matter will be propelled away from the packing 33 during the rotation of the thimble. In this instance, the projecting outer end of the thimble is shown in the form of a divergently inclined annular flange 38 which constitutes the slinger just mentioned.

The thimble 17 is preferably a sheet metal member which can be produced economically by the use of suitable drawing or spinning dies and, in accordance with another feature of this invention, is made of a relatively soft metal such as aluminum. The sleeve 36 of this thimble is of a size in relation to the shaft 15 such that it will have a press fit on the shaft when the bearing assembly 10 is applied thereto and this will serve to connect the thimble for rotation with the shaft. Although the thimble is made substantially cylindrical in shape, extreme accuracy is not required because some variations or irregularities can be tolerated inasmuch as the soft metal used in this member will enable the thimble to accommodate itself to the shaft 15.

To facilitate the insertion of the shaft 15 into the thimble 17, the shaft is provided with an axially extending flat 39 thereon which will permit the escape of trapped air from the thimble and will also accommodate excess metal of the wall of the thimble in the event that the thimble is of such size or shape as to require a flow or displacement of the metal thereof during the insertion of the shaft. The flat 39 also serves to establish an interlock between the shaft 15 and the thimble so that the thimble will necessarily rotate with the shaft and such that looseness will not be likely to develop between the shaft and thimble.

From the construction and assembly above described for the parts constituting the improved bearing structure 10, it will now be recognized that the bearing chamber 18c of the outer housing 18 is a closed and sealed chamber in which a supply of lubricant 40 can be confined for lubricating the bearing unit 19 and the axial thrust seat 24a during the normal life of the device. The lubricant 40 will be retained in the chamber 18c by reason of the fact that the thimble 17 closes the opening 31 of the cover 18b and the packing 33 forms a seal around the thimble. Since the lubricant 40 confined in the chamber 18c is provided in a quantity sufficient to lubricate the bearing unit 19 for an indefinite period of service, no additional lubricant will need to be supplied. In addition to confining the lubricant 40 in the chamber 18c the thimble 17 and the packing ring 33 also serve to exclude dirt, water and other foreign matter from this chamber.

Figure 4:
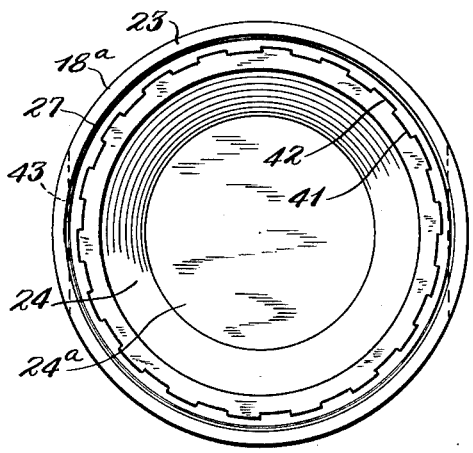
Fig. 4 is an end elevation showing the outer housing member when viewed from the open end thereof.
Figure 3:
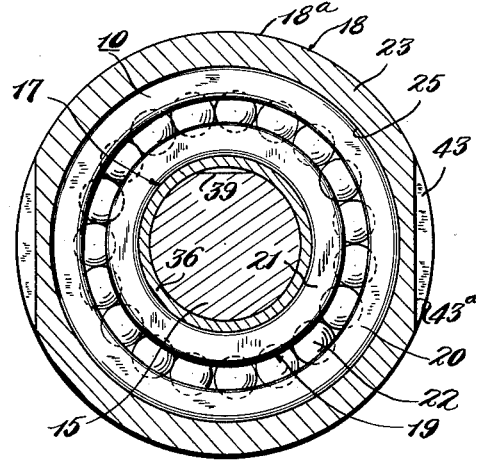
Fig. 3 is a transverse sectional view taken through the bearing assembly substantially as indicated by section line 3—3 of Fig. 2.

In connection with the outer housing 18 which is formed by the housing members 18a and 18b, it should be explained that these housing members are of such simple form that they can be produced as die castings, and hence, can be very economically manufactured and will require substantially no machining operations thereon with the exception of the internal annular groove 32 of the cover 18b. Fig. 4 of the drawing shows the housing member 18a as having the inner annular face 25 thereof provided with teeth or serrations 41 which are formed on such face during the casting of this housing member. When these serrations are provided they enable the bearing unit 19 to be more readily assembled into the housing member 18a because the teeth 41 and the intervening slots or grooves 42 will accommodate irregularities in size or shape which may be present either in this housing member or in the outer race 20 of the bearing unit 19. During the mounting of the bearing unit 19 in the housing member 18a any such existing irregularities will be accommodated by a displacement of metal from the teeth 41 into the slots 42.

For mounting the bearing assembly 10 in one of the recesses 16 of the support 12, the outer housing member 18a is preferably provided with diametrically opposed slots 43 in the outer surface of the side wall 23. These slots have an axial width slightly greater than the thickness of the plate constituting the support 12 so that the portions of the plate which define the edges 16a of the recess 16 will engage in the slots. The bottoms of the slots 43 provide a pair of diametrically opposed substantially parallel flat faces 43a on the housing member 18a which cooperate with the edge portions 16a of the support 12 for holding the bearing assembly 10 against rotation in the recess 16.

From the foregoing description and the accompanying drawing it will now be readily understood that this invention provides an improved antifriction bearing in the form of a self-contained device having a bearing chamber defined in an outer housing and a prefabricated conventional standard antifriction bearing unit mounted in such chamber, and in which the bearing chamber is closed and sealed by the use of a thimble which also forms a socket adapted to receive an end of the shaft to be supported. It will now also be understood that a supply of lubricant contained in the bearing chamber will be confined therein by the thimble and seal so that it will not be necessary to supply any additional lubricant during the normal life of the device. Additionally, it will be seen that this improved bearing will be watertight such that dirt, water and other foreign matter will be effectively excluded therefrom and the outer housing will protect the bearing races from blows which would damage such races or cause misalignment thereof. It will be understood, furthermore, that the improved bearing assembly provided by this invention comprises a relatively small number of parts which can be economically manufactured and assembled and that the resulting assembly can be conveniently handled and shipped and can also be quickly and easily applied to a shaft or the like and to a support on which the shaft is to be mounted.

Although the improved bearing assembly of this invention has been illustrated and described herein to a somewhat detailed extent, it should be understood that the invention is not to be regarded as being limited correspondingly in scope but includes all changes and modifications coming within the terms of the claims hereof.

Having thus described my invention, I claim:

1. A self-contained antifriction bearing assembly comprising, an outer housing having a bearing chamber therein, a prefabricated antifriction bearing unit in said housing and comprising inner and outer races and a series of rolling elements therebetween, said bearing unit having its outer race mounted in relatively fixed relation in said chamber and said housing having an opening in one end thereof in substantially coaxial relation to said inner race, and a thimble having a closed inner end engaged in said race for rotation of the thimble therewith and a sleeve portion projecting from said chamber through and substantially closing said opening, said housing having a serrated inner annular wall and said outer race being of a size to seatingly engage said serrated inner annular wall with a press fit.

2. A sealed lubricant-charged self-contained antifriction bearing assembly comprising, a cup-shaped housing member having an annular side wall and a substantially flat end wall, a cover member, said housing and cover members having connecting portions cooperating with a press fit and said members defining a bearing chamber, internal seat means on the end and side walls of said cup-shaped housing member, a prefabricated standard antifriction bearing unit comprising inner and outer races and a series of rolling elements therebetween, said bearing unit being disposed in said chamber and having its outer race mounted in relatively fixed relation to said cup-shaped member by engagement with certain of said seat means thereof, said cover having a substantially central opening communicating with said chamber in coaxial relation to said inner race, a thimble having a transverse inner end wall engaging the seat means of the end wall of said cup-shaped member and a sleeve having one portion engaged in said inner race for rotation of the thimble therewith and another portion extending through and substantially closing said opening, lubricant confined in said chamber, and packing means carried by said cover in surrounding relation to said opening and sealingly engaging said other sleeve portion.

3. In a bearing structure of the character described, a cup-shaped housing member having an annular side wall defining an internal annular bearing seat and an end wall defining a substantially flat internal end bearing surface, a cover member, said housing and cover members being die castings and having connecting portions cooperating with a press fit and said members defining a bearing chamber, a prefabricated antifriction bearing unit comprising inner and outer races and a series of rolling elements therebetween, said bearing unit being disposed in said chamber and having it outer race in press fit engagement with said internal annular bearing seat, said cover having a substantially central opening communicating with said chamber in coaxial relation to said inner race, a thimble defining a socket and comprising a transverse inner end wall engaging said end bearing surface and a sleeve having one portion engaged in said inner race for rotation of the thimble therewith and another portion extending through and substantially closing the opening of said cover member, and a shaft end or the like having a press fit engagement in the thimble socket, said thimble being formed of a relatively soft sheet metal enabling the thimble to accommodate itself to said shaft end during the formation of the press fit engagement of the shaft end therein.

ROBERT D. BEATTY, Jr.

REFERENCES CITED

The following references are of record in the file of this patent:

UNITED STATES PATENTS

| Number | Name | Date |
|---|---|---|
| 1,692,460 | Mattison | Nov. 20, 1928 |
| 2,010,013 | Leister et al. | Nov. 30, 1937 |